US012597104B2

(12) United States Patent
Nakagawa et al.

(10) Patent No.: US 12,597,104 B2
(45) Date of Patent: Apr. 7, 2026

(54) IMAGE PROCESSING DEVICE

(71) Applicant: SK hynix Inc., Gyeonggi-do (KR)

(72) Inventors: Daiki Nakagawa, Tokyo (JP);
Kazuhiro Yahata, Tokyo (JP)

(73) Assignee: SK hynix Inc., Gyeonggi-do (KR)

( * ) Notice: Subject to any disclaimer, the term of this patent is extended or adjusted under 35 U.S.C. 154(b) by 47 days.

(21) Appl. No.: 18/820,260

(22) Filed: Aug. 30, 2024

(65) Prior Publication Data

US 2025/0095119 A1      Mar. 20, 2025

(30) Foreign Application Priority Data

Sep. 18, 2023    (KR) ........................ 10-2023-0123668

(51) Int. Cl.
*G06T 5/70*          (2024.01)
*G06T 5/20*          (2006.01)
*G06T 5/50*          (2006.01)

(52) U.S. Cl.
CPC .................. G06T 5/70 (2024.01); G06T 5/20 (2013.01); G06T 5/50 (2013.01); *G06T 2207/20224* (2013.01)

(58) Field of Classification Search
CPC . G06T 2207/20084; G06T 2207/20224; G06T 5/20; G06T 5/50; G06T 5/60; G06T 5/70
See application file for complete search history.

(56) References Cited

U.S. PATENT DOCUMENTS

| | | | | |
|---|---|---|---|---|
| 6,222,881 | B1* | 4/2001 | Walker ................. | H04N 19/172 |
| | | | | 375/E7.176 |
| 9,639,923 | B2* | 5/2017 | Chien ........................ | G06T 5/70 |
| 11,122,188 | B1* | 9/2021 | Qiu ........................... | G06T 5/70 |
| 12,250,471 | B2* | 3/2025 | Nishikawa ............. | H04N 23/73 |
| 12,456,989 | B2* | 10/2025 | Guo ...................... | H03M 3/464 |
| 2006/0125688 | A1* | 6/2006 | Henderson .............. | G01S 19/37 |
| | | | | 342/357.59 |
| 2023/0105527 | A1* | 4/2023 | Tsai ..................... | H04N 25/674 |
| | | | | 348/241 |
| 2023/0169761 | A1* | 6/2023 | Hasegawa ................. | G06T 5/60 |
| | | | | 382/156 |

FOREIGN PATENT DOCUMENTS

| | | | |
|---|---|---|---|
| JP | 5381451 | B2 | 1/2014 |
| KR | 10-2015-0021821 | A | 3/2015 |

* cited by examiner

*Primary Examiner* — Antoinette T Spinks
(74) *Attorney, Agent, or Firm* — IP & T GROUP LLP

(57)          ABSTRACT

An image processing device includes a bit length determiner configured to determine a bit length which indicates a number of at least one bit from among all bits of image data, an upper bit extractor configured to extract, from the image data, at least one upper bit corresponding to the bit length, and a noise processing unit configured to perform noise reduction processing for a target pixel using the at least one upper bit of the image data.

20 Claims, 7 Drawing Sheets

IMAGE PROCESSING DEVICE

CROSS-REFERENCE TO RELATED APPLICATION

This patent application claims the priority and benefits of Korean patent application No. 10-2023-0123668, filed on Sep. 18, 2023, the disclosure of which is incorporated herein by reference in its entirety.

TECHNICAL FIELD

The technology and embodiments of the present disclosure generally relate to an image processing device capable of performing noise reduction processing.

BACKGROUND

An image sensing device is a device for capturing optical images by converting light into electrical signals using a photosensitive semiconductor material which reacts to light. With the development of automotive, medical, computer and communication industries, the demand for high-performance image sensing devices has been increasing in various fields such as smart phones, digital cameras, game machines, Internet of Things (IoT), robots, surveillance cameras and medical micro cameras.

Optical images captured by an image sensing device may contain noise caused by various factors generated inside and outside the image sensing device. When processing the optical image, a noise removal operation may be performed to minimize the amount of noise. In order to perform the noise removal operation, image data of neighboring pixels should be sufficiently stored and cross-referenced.

SUMMARY

In accordance with an embodiment of the present disclosure, an image processing device may include a bit length determiner configured to determine a bit length which indicates a number of at least one bit from among all bits of image data; an upper bit extractor configured to extract, from the image data, at least one upper bit corresponding to the bit length; and a noise processing unit configured to perform noise reduction processing for a target pixel using the at least one upper bit of the image data.

In accordance with another embodiment of the present disclosure, an image processing device may include a bit length determiner configured to determine a bit length, which indicates a number of at least one bit from among all bits of image data, based on characteristic information of an image sensing device which generated the image data or characteristic information of the image data; and a noise processing unit configured to perform noise reduction processing for a target pixel using at least one upper bit corresponding to the bit length, the at least one upper bit being extracted from the image data.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
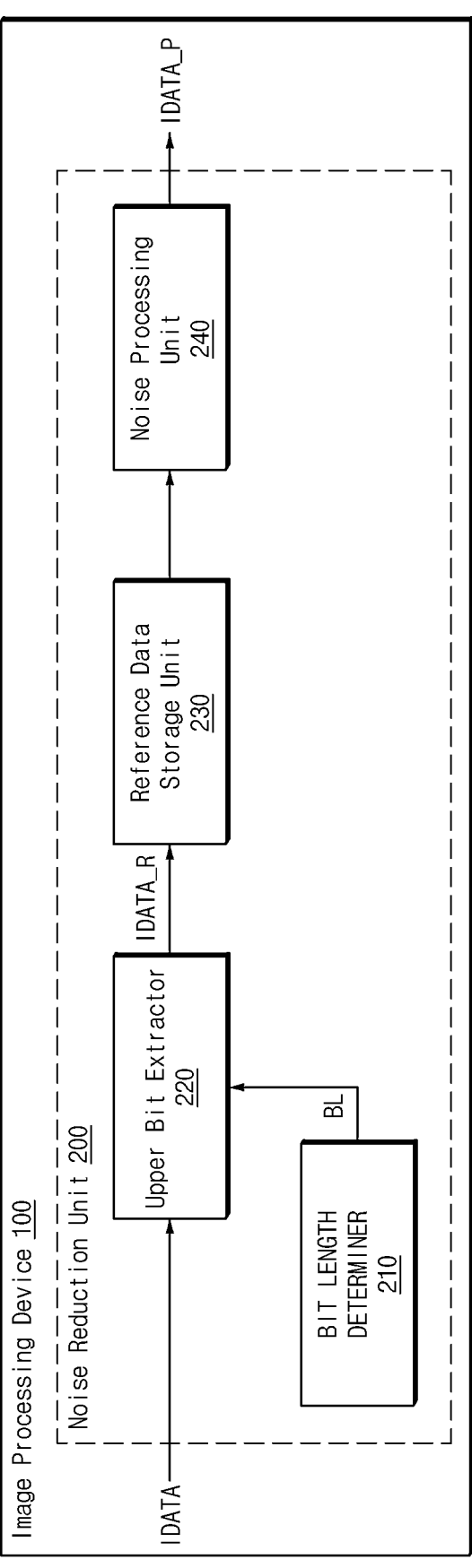
FIG. 1 is a block diagram illustrating an image processing device based on some embodiments of the present disclosure.

The present disclosure provides embodiments and examples of an image processing device capable of performing noise reduction processing that may be used in configurations to substantially address one or more technical or engineering issues and to mitigate limitations or disadvantages encountered in some other image processing devices. Some embodiments of the present disclosure relate to an image processing device capable of efficiently performing noise reduction processing. In recognition of the issues above, the image processing device based on some embodiments of the present disclosure may reduce the size of image data of reference pixels to be used in noise reduction processing, may store the resultant image data, and may maximize noise reduction performance by maximally increasing the number of reference pixels to be stored.

Reference will now be made in detail to the embodiments of the present disclosure, examples of which are illustrated in the accompanying drawings. Wherever possible, the same reference numbers will be used throughout the drawings to refer to the same or like parts. While the embodiments of the present disclosure are susceptible to various modifications and alternative forms, specific embodiments thereof are shown by way of example in the drawings. However, the present disclosure should not be construed as being limited to the embodiments set forth herein.

Hereinafter, various embodiments of the present disclosure will be described with reference to the accompanying drawings. However, it should be understood that the disclosed technology is not limited to specific embodiments, but includes various modifications, equivalents and/or alternatives of the embodiments. The embodiments of the present disclosure may provide a variety of effects capable of being directly or indirectly recognized through the disclosed technology.

Various embodiments of the present disclosure relate to an image processing device capable of efficiently performing noise reduction processing.

It is to be understood that both the foregoing general description and the following detailed description of the disclosed technology are illustrative and descriptive and are intended to provide further description of the embodiments of the present disclosure as claimed.

FIG. 1 is a block diagram illustrating an image processing device based on some embodiments of the present disclosure.

Referring to FIG. 1, the image processing device 100 may perform at least one image signal process on image data IDATA to generate the processed image data IDATA_P.

The image processing device 100 may reduce noise of image data IDATA, and may perform various types of image signal processing (e.g., demosaicing, defective pixel correction, gamma correction, color filter array interpolation, color matrix, color correction, color enhancement, lens distortion correction, etc.) for image-quality improvement of the image data. The image processing device 100 may compress image data that has been created by execution of image signal processing for image-quality improvement, such that the image processing device 100 can create an image file using the compressed image data. Alternatively, the image processing device 100 may recover image data from the image file. In this case, the scheme for compressing such image data may be a reversible format or an irreversible format. As a representative example of such compression format, in the case of using a still image, Joint Photographic Experts Group (JPEG) format, JPEG2000 format, or the like can be used. In addition, in the case of using moving images, a plurality of frames can be compressed according to Moving Picture Experts Group (MPEG) standards such that moving image files can be created.

The image data IDATA may be generated by an image sensing device that captures an optical image of a scene, but the scope of the disclosed technology is not limited thereto. The image sensing device may include a pixel array including a plurality of pixels configured to sense incident light received from a scene, a control circuit configured to control the pixel array, and a readout circuit configured to output digital image data IDATA by converting an analog pixel signal received from the pixel array into the digital image data IDATA. In some embodiments of the present disclosure the image data IDATA may be generated by the image sensing device.

The pixel array may include a color filter array (CFA) in which color filters are arranged according to a predetermined pattern (e.g., a Bayer pattern, a quad-Bayer pattern, nona-Bayer pattern, an RGBW pattern, etc.) so that each color filter can sense light of a predetermined wavelength band. The pattern of the image data IDATA may be determined according to the type of the pattern of the CFA.

The image processing device 100 may be a computing device that is mounted on a chip that is independent from a chip on which the image sensing device is mounted. The chip on which the image sensing device is mounted and the chip on which the image processing device 100 is mounted may communicate with each other through a predetermined interface. In some embodiments, the chip on which the image sensing device is mounted and the chip on which the computing device is mounted may be implemented in one package, for example, a multi-chip package (MCP), but the scope of the disclosed technology is not limited thereto.

The image processing device 100 may include a noise reduction unit 200 that performs noise reduction processing to reduce noise components included in image data IDATA. The image processing device 100 may include a processor configured to process data and/or instructions required to perform the function of the noise reduction unit 200, and a memory configured to store data and/or instructions required to perform operations of the processor. In some embodiments, the image processing device 100 may perform at least one image signal process on the image data IDATA received from the image sensing device to generate processed image data IDATA_P. Further, the image processing device 100 may store the processed image data IDATA_P in the memory or may output the processed image data IDATA_P to an external device (e.g., an application processor, a flash memory, a display, etc.).

The noise components included in the image data IDATA may include fixed pattern noise and/or temporal noise.

The fixed pattern noise may refer to noise having a predetermined pattern due to hardware characteristics (e.g., lens shading) of the image sensing device.

The temporal noise may refer to noise that occurs randomly without a predetermined pattern, and may include shot noise, dark current noise, etc.

The noise reduction unit 200 may use image data of at least one reference pixel associated with a target pixel that is subject to noise processing to reduce noise components included in the image data IDATA. Here, the reference pixel may be a neighboring pixel that is physically close to the target pixel, or may be a pixel belonging to the same row or column as the target pixel. In some embodiments, the reference pixel may be a pixel included in a kernel (e.g., 5×5 kernel) including the target pixel that is located at a center of the kernel. The noise reduction unit 200 may include a bit length determiner 210, an upper bit extractor 220, a reference data storage unit 230, and a noise processing unit 240.

The bit length determiner 210 may determine a bit length (BL) that indicates the number of at least one bit to be used for noise reduction processing of the target pixel from among all bits of the image data IDATA corresponding to each pixel.

Figure 2:
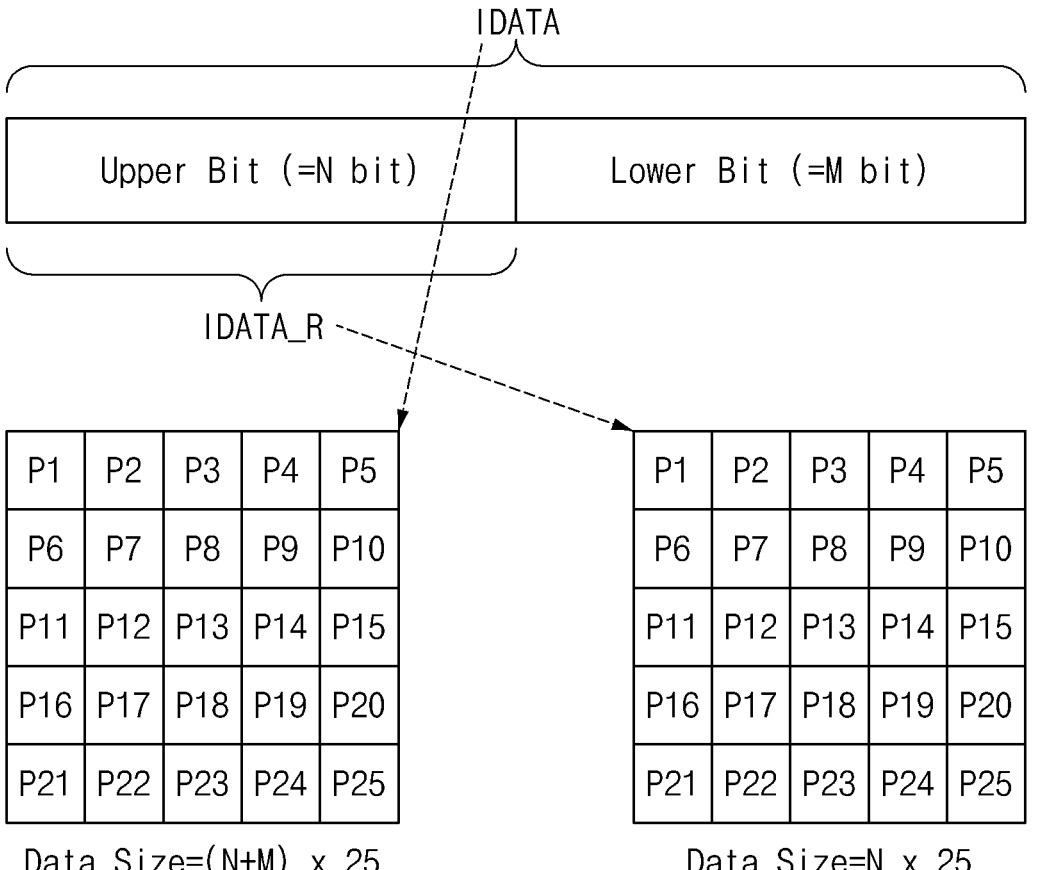
FIG. 2 is a schematic diagram illustrating a result of a comparison between image data and reference image data based on some embodiments of the present disclosure.

Referring to FIG. 2, image data IDATA corresponding to each pixel may include a total of (N+M) bits, where each of N and M is an integer of 1 or more. That is, the image data IDATA may include N upper bits and M lower bits. Each of the upper bits may refer to a bit indicating a relatively high digit of image data IDATA. Therefore, the upper bits may include a most significant bit (MSB). Each of the lower bits may refer to a bit indicating a relatively low digit of image data (IDATA). Therefore, the lower bits may include a least significant bit (LSB).

The bit length BL may represent the number of bits to be used for noise processing. In one embodiment, the bit length BL may mean N bits, which is the number of bits of the upper bits in the image data. That is, only the reference image data IDATA_R corresponding to the upper bits in the image data IDATA may be used for noise processing, and the lower bits may not be used for noise processing.

As illustrated in FIG. 2, the size of image data IDATA corresponding to a total of 25 pixels of the (5×5) kernel may be denoted by "(N+M)×25" bits, while the size of reference image data IDATA_R corresponding to the total of 25 pixels of the (5×5) kernel may be reduced to (N×25) bits.

For example, when image data IDATA corresponding to one pixel includes 10 bits and the reference data storage unit 230 has a storage capacity of 240 bits, in principle, the reference data storage unit 230 can store only image data of pixels (i.e., 24 pixels excluding the target pixel from 25 pixels) corresponding to the (5×5) kernel including the target pixel. However, when the bit length BL is set to 5, the reference data storage unit 230 may store only image data containing five bits per pixel, so that image data of pixels (i.e., 48 pixels excluding the target pixel from 49 pixels) corresponding to a (7×7) kernel including the target pixel can be stored. Accordingly, the number of reference pixels that can be stored in the reference data storage unit 230 and used for noise reduction processing of the target pixel can be increased.

That is, the bit length determiner 210 may determine the bit length BL, which is the number of bits to be used for noise processing from among all bits of the image data IDATA corresponding to each pixel, so that the size of per-pixel image data required for such noise processing can be reduced. The bit length determiner 210 may determine the bit length BL using at least one of characteristic information (e.g., a gain, an exposure time, etc. of the image sensing device) of the image sensing device configured to generate the image data or other characteristic information (e.g., a noise value of image data, a frame difference of image data, etc.) of the image data.

Embodiments in which the bit length determiner 210 determines the bit length BL will be described later with reference to FIGS. 3 to 6. In addition, the embodiments shown in FIGS. 3 to 6 are not mutually exclusive, and at least two or more embodiments may be combined with each other.

The upper bit extractor 220 may extract at least one upper bit corresponding to the bit length BL from the image data IDATA based on the bit length BL provided from the bit length determiner 210. For example, when the image data IDATA corresponding to each pixel consists of 10 bits and the bit length BL is 5, the upper bit extractor 220 may extract five upper bits from the image data IDATA, and may output reference image data IDATA_R including the five upper bits.

The reference data storage unit 230 may store the reference image data IDATA_R, and may provide the reference image data IDATA_R upon receiving a request from the noise processing unit 240. In addition, the reference data storage unit 230 may delete some data from among the currently stored reference image data IDATA_R under the control of the noise processing unit 240. For example, the reference data storage unit 230 may store reference image data IDATA_R of a plurality of reference pixels required for noise processing of the target pixel. When such noise processing of the target pixel is completed, the noise processing unit 240 may control the reference data storage unit 230 to delete reference image data IDATA_R of at least one reference pixel that is unnecessary for noise processing of the next target pixel. Accordingly, the reference data storage unit 230 may store reference image data IDATA_R of at least one reference pixel required for noise processing of the next target pixel. The purpose of the above operations is to enable the reference image data IDATA_R of reference pixels required for noise processing to be stored even though the reference data storage unit 230 has a limited storage capacity.

The reference data storage unit 230 may refer to a memory device with a predetermined storage capacity. For example, the memory device may refer to a volatile memory device (e.g., a dynamic random access memory DRAM) capable of temporarily storing data, or a non-volatile memory device (e.g., a flash memory).

The noise processing unit 240 may perform noise reduction processing to reduce noise components included in image data IDATA of the target pixel. The noise components may include fixed pattern noise and/or temporary noise. Noise reduction processing may be performed using statistical information of the image, pre-learned dictionary information, neural network, etc.

In some embodiments, the noise processing unit 240 may perform filtering using at least one of a Gaussian filter, an epsilon filter, a median filter, an averaging filter, a non-local means (NLM) filter, a block-matching and 3D (BM3D) filter, an edge reconstruction filter, an error compensation filter, a bilateral filter, a trilateral filter, a joint-filter-withcolor, a joint bilateral filter, and an offset compensated filter, and may thus perform noise reduction processing based on the result of such filtering.

In other embodiments, the noise processing unit 240 may perform noise reduction processing using a denoising convolutional neural network (DnCNN).

The noise processing unit 240 may perform noise reduction processing of the target pixel by referring to the reference image data IDATA_R of at least one reference pixel stored in the reference data storage unit 230. At this time, as the number of reference pixels used for noise reduction processing increases, noise reduction performance may increase. However, as the number of reference pixels for noise reduction processing of the target pixel increases, the storage capacity required for the reference data storage unit 230 and the power consumed to drive the reference data storage unit 230 may increase. Therefore, since the number of reference pixels is inevitably limited to a certain level or less, as many reference pixels as possible must be stored in the reference data storage unit 230 within the allowable storage capacity.

In some embodiments, the size of image data of reference pixels used in noise reduction processing is reduced and the resultant image data of the reference pixels is then stored, so that the noise reduction performance can be maximized by increasing the number of reference pixels to be stored as much as possible. In addition, the number of calculation times required for noise reduction processing required per reference pixel can be reduced by reducing the size of image data of each reference pixel, resulting in an increase in data processing speed.

Figure 3:
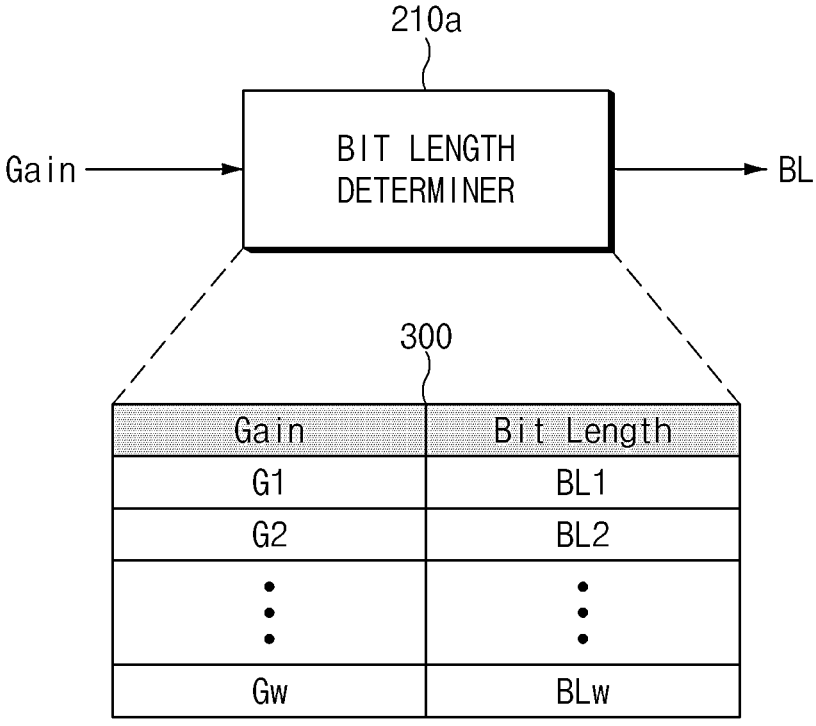
FIG. 3 is a schematic diagram illustrating a method for operating a bit length determiner shown in FIG. 1 based on some embodiments of the present disclosure.

FIG. 3 is a schematic diagram illustrating a method for operating the bit length determiner 210 shown in FIG. 1 based on some embodiments of the present disclosure.

Referring to FIG. 3, a bit length determiner 210a is an example of the bit length determiner 210 shown in FIG. 1. The bit length determiner 210a may determine a bit length based on a gain of an image sensing device. The gain may be received from the external device (e.g., the image sensing device).

In some embodiments, the gain may be a conversion gain of a pixel circuit corresponding to a target pixel, may be an analog gain of an analog-to-digital converter (ADC) corresponding to the target pixel, or may be a product of the conversion gain and the analog gain. The pixel circuit and the ADC may be included in the image sensing device. Here, the conversion gain may mean a ratio (e.g., denoted by 'mV/e') between the amount of photocharges (i.e., e) and the voltage of electrical signals (i.e., mV) generated in response to the amount of photocharges. The amount of photocharges may be generated by sensing incident light of the pixel circuit. The analog gain may refer to a ratio (e.g., denoted by 'DN/mV') between a voltage of the electrical signal (i.e., mV) received from the pixel circuit and a digital value (i.e., DN) acquired by conversion of the voltage of the electrical signal, in the ADC.

The bit length determiner 210a may store a first lookup table 300 in which the gains and the bit lengths are matched with each other. As illustrated in FIG. 3, the first lookup table 300 may refer to a table in which the first to W-th gains G1-Gw, where 'W' is an integer of 2 or more, are respectively matched to the first to W-th bit lengths BL1-BLw.

As the gain increases in the first lookup table 300, the bit length corresponding to the gain may decrease. This is because the number of digits greatly affected by noise components of the image data increases in proportion to the increasing gain.

In some embodiments, the first lookup table 300 may be generated by experimentally determining a particular gain and a bit length appropriate for this gain. For example, a noise standard deviation of image data generated by the image sensing device having a specific gain may be calculated. Further, reduction bits required to represent a numerical value within a multiple range (for example, $\frac{1}{10}$ to 1 times) of the noise standard deviation may be calculated. In one embodiment, the reduction bits may be subtracted from the total number of bits of the image data IDATA, so that the number of upper bits can be calculated. The number of upper bits can be greatly affected by noise components of the image data. Here, the noise standard deviation can be obtained by calculating the standard deviation of image data, which is generated in a state in which light incident upon the image sensing device is completely blocked during a test process of the image sensing device.

For example, when a first gain G1 corresponds to a reference gain, a second gain G2 is twice the first gain G1, a third gain G3 is four times the first gain G1, and a fourth gain G4 is 8 times the first gain G1, a first bit length BL1 may be denoted by 10 bits, a second bit length BL2 may be denoted by 9 bits, a third bit length BL3 may be denoted by 8 bits, and a fourth bit length BL4 may be denoted by 7 bits.

The bit length determiner 210*a* may determine the bit length BL that is matched to (or most similar to) a gain provided from the outside by referring to the first lookup table 300. Further, the bit length determiner 210*a* may provide the determined bit length BL to the upper bit extractor 220.

Figure 4:
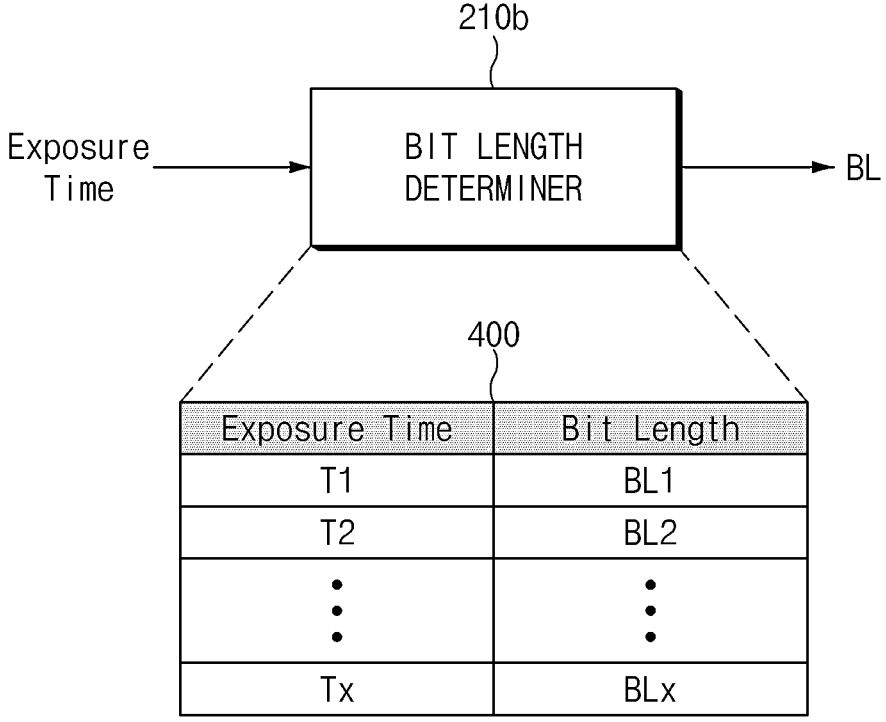
FIG. 4 is a schematic diagram illustrating another method for operating the bit length determiner shown in FIG. 1 based on some embodiments of the present disclosure.

FIG. 4 is a schematic diagram illustrating another method for operating the bit length determiner 210 shown in FIG. 1 based on some embodiments of the present disclosure.

Referring to FIG. 4, a bit length determiner 210*b* may be another example of the bit length determiner 210 shown in FIG. 1. The bit length determiner 210*b* may determine a bit length based on an exposure time provided from the outside (e.g., the image sensing device).

The exposure time may refer to an exposure time of a pixel circuit corresponding to the target pixel of the image sensing device. Here, the exposure time may mean a time taken for the pixel circuit to detect the incident light (i.e., the time taken to generate photocharges corresponding to the incident light).

The bit length determiner 210*b* may store a second lookup table 400 in which the exposure times and the bit lengths are matched with each other. As illustrated in FIG. 4, the second lookup table 400 may be a table in which the first to X-th exposure times T1-Tx, where 'X' is an integer of 2 or more, are respectively matched to the first to X-th bit lengths BL1-BLx.

As the exposure time increases in the second lookup table 400, the bit length corresponding to the exposure time may decrease. This is because the number of digits greatly affected by noise components of the image data increases in proportion to the increasing exposure time.

In some embodiments, the second lookup table 400 may be generated by experimentally determining a particular exposure time and a bit length appropriate for this exposure time. For example, a noise standard deviation of image data generated by the image sensing device having a specific exposure time may be calculated. Further, reduction bits required to represent a numerical value within a multiple range (for example, $\frac{1}{10}$ to 1 times) of the noise standard deviation may be calculated. In one embodiment, the reduction bits may be subtracted from the total number of bits of the image data IDATA, so that the number of upper bits can be calculated. The number of upper bits can be greatly affected by noise components of the image data. Here, the noise standard deviation can be obtained by calculating the standard deviation of image data, which is generated in a state in which light incident upon the image sensing device is completely blocked during a test process of the image sensing device.

For example, when a first exposure time T1 corresponds to a reference exposure time, a second exposure time T2 is 1.2 times the first exposure time T1, a third exposure time T3 is 1.4 times the first exposure time T1, and a fourth exposure time T4 is 1.6 times the first exposure time T1, a first bit length BL1 may be denoted by 10 bits, a second bit length BL2 may be denoted by 9 bits, a third bit length BL3 may be denoted by 8 bits, and a fourth bit length BL4 may be denoted by 7 bits.

The bit length determiner 210*b* may determine the bit length BL that is matched to (or most similar to) an exposure time provided from the outside by referring to the second lookup table 400. Further, the bit length determiner 210*b* may provide the determined bit length BL to the upper bit extractor 220.

Figure 5:
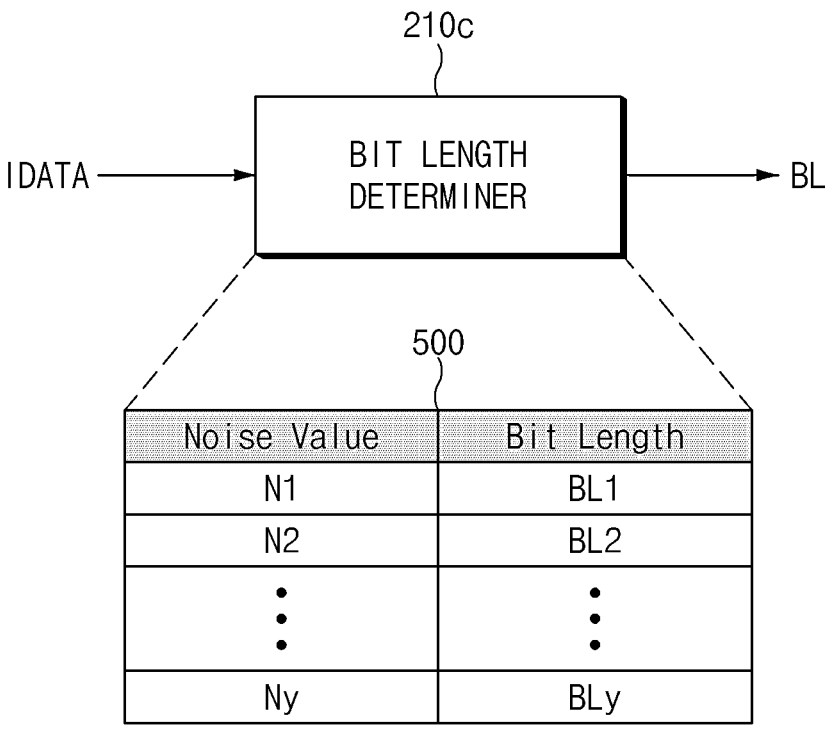
FIG. 5 is a schematic diagram illustrating another method for operating the bit length determiner shown in FIG. 1 based on some embodiments of the present disclosure.

FIG. 5 is a schematic diagram illustrating another method for operating the bit length determiner 210 shown in FIG. 1 based on some embodiments of the present disclosure.

Referring to FIG. 5, a bit length determiner 210*c* may be another example of the bit length determiner 210 shown in FIG. 1. The bit length determiner 210*c* may calculate a noise value of the image data IDATA based on the image data IDATA, and may determine a bit length BL corresponding to the calculated noise value.

A pixel array of the image sensing device may include active pixels and optical black pixels. The active pixels may detect incident light and generate an electrical signal corresponding to the intensity of the incident light. The optical black pixels may block incident light and generate an electrical signal corresponding to a dark current regardless of the incident light. Here, the dark current is a current generated in the optical black pixels when incident light was blocked. Accordingly, the image data IDATA may include image data generated by active pixels and image data generated by optical black pixels.

In some embodiments, the bit length determiner 210*c* may calculate a particular noise value of image data generated by optical black pixels corresponding to the target pixel (e.g., belonging to the same row as the target pixel), and may determine a bit length BL corresponding to the calculated noise value.

In this case, the noise value may be the standard deviation of image data generated by optical black pixels corresponding to the target pixel.

As an example, the bit length BL corresponding to the calculated noise value may be determined using a floor bit reduction method. The floor bit reduction method may refer to a method for determining a specific value obtained by subtracting the reduction bits from the total number of bits of the image data IDATA. Here, the reduction bits indicate a value obtained by multiplying a standard deviation of image data generated by the optical black pixels by a predetermined reduction ratio. The reduction ratio may refer to a ratio by which the relationship between the standard deviation of image data and the number of lower bits unaffected by noise components of the image data is experimentally determined. When the standard deviation of image data generated by the optical black pixels is multiplied by a predetermined reduction ratio (e.g., 3/threshold), the reduction bits corresponding to the number of lower bits unaffected by noise components of the image data can be calculated in response to the resultant standard deviation. Subsequently, when the reduction bits are subtracted from the total number of bits of the image data IDATA, the number of upper bits greatly affected by the noise components of the image data can be calculated.

As another example, the bit length BL corresponding to the calculated noise value may be determined using a third lookup table 500 in which the pre-stored noise values and the bit lengths are matched with each other. As illustrated in FIG. 5, the third lookup table 500 may refer to a table in which the first to Y-th noise values N1-Ny, where 'Y' is an integer of 2 or more, are respectively matched to the first to Y-th bit lengths BL1-BLy. The third lookup table 500 may be stored in the bit length determiner 210c.

As the noise value increases in the third lookup table 500, the bit length corresponding to the noise value may decrease. This is because the number of digits greatly affected by noise components of the image data increases in proportion to the increasing noise value.

For example, when a first noise value N1 corresponds to a reference noise value, a second noise value N2 is twice the first noise value N1, a third noise value N3 is three times the first noise value N1, and a fourth noise value N4 is four times the first noise value N1, a first bit length BL1 may be denoted by 10 bits, a second bit length BL2 may be denoted by 9 bits, a third bit length BL3 may be denoted by 8 bits, and a fourth bit length BL4 may be denoted by 7 bits.

The bit length determiner 210c may determine the bit length BL that is matched to (or most similar to) the noise value of the image data IDATA by referring to the third lookup table 500. Further, the bit length determiner 210c may provide the determined bit length BL to the upper bit extractor 220.

Figure 6:
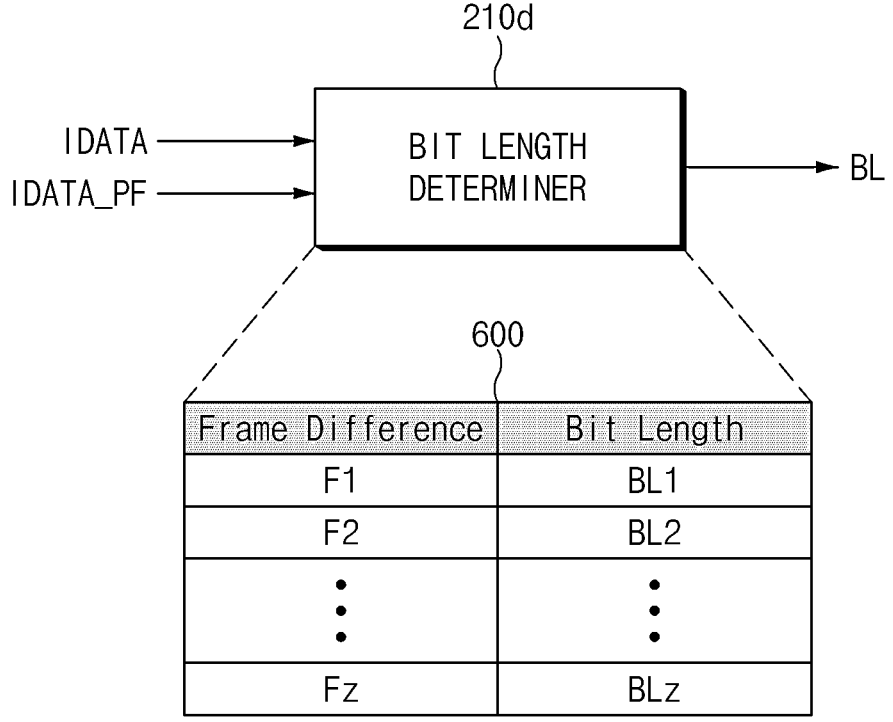
FIG. 6 is a schematic diagram illustrating another method for operating the bit length determiner shown in FIG. 1 based on some embodiments of the present disclosure.

FIG. 6 is a schematic diagram illustrating another method for operating the bit length determiner 210 shown in FIG. 1 based on some embodiments of the present disclosure.

Referring to FIG. 6, a bit length determiner 210d may be another example of the bit length determiner 210 shown in FIG. 1. The bit length determiner 210d may calculate a frame difference based on image data IDATA of the current frame and image data IDATA_PF of the previous frame, and may determine the bit length BL corresponding to the calculated frame difference.

The image sensing device may sequentially generate image data IDATA in units of a frame (i.e., on a frame basis), may generate image data IDATA_PF of the previous frame, and may generate image data IDATA of the current frame. Accordingly, the image processing device 100 may sequentially perform image processing of the image data IDATA_PF of the previous frame and image processing of the image data IDATA_PF of the previous frame. In this case, even though image processing for the image data IDATA_PF of the previous frame is completed, the image data IDATA_PF of the previous frame may be stored and maintained in an external memory (e.g., a frame memory) that can be accessed by the image processing device 100.

The bit length determiner 210d may compare image data IDATA of the current frame corresponding to the target kernel (e.g., (5×5) kernel) having a predetermined size with respect to the target pixel with image data (IDATA_PF) of the previous frame corresponding to the target kernel, and may calculate a frame difference based on the result of such comparison. In more detail, the expression "—corresponding to the target kernel" may mean the expression "—corresponding to each of the pixels included in the target kernels.

In some embodiments, the frame difference may be obtained by i) calculating, for each of pixels included in a target kernel including the target pixel, an absolute value (or square value) of a value obtained by subtracting the image data IDATA of the current frame from the image data IDATA_PF of the previous frame; and ii) performing summation of the absolute values respectively calculated for the pixels included in the target kernel. The frame difference may refer to a value obtained by performing summation of the absolute values (or square values) respectively calculated for the pixels included in the target kernel.

The bit length determiner 210d may determine the bit length BL corresponding to the calculated frame difference using a fourth lookup table 600 in which the frame differences and the bit lengths are matched with each other. As illustrated in FIG. 6, the fourth lookup table 600 may refer to a table in which the first to Z-th frame differences F1-Fz, where Z is an integer of 2 or more, are respectively matched to the first to Z-th bit lengths BL1-BLz, and may be stored in the bit length determiner 210d.

As the frame difference decreases in the fourth lookup table 600, the bit length corresponding to the frame difference may decrease. This is because the number of digits greatly affected by noise components of the image data increases as the frame difference decreases.

For example, when a first frame difference F1 corresponds to a reference frame difference, a second frame difference F2 is 0.9 times the first frame difference F1, a third frame difference F3 is 0.8 times the first frame difference F1, and a fourth frame difference F4 is 0.7 times the first frame difference F1, a first bit length BL1 may be denoted by 10 bits, a second bit length BL2 may be denoted by 9 bits, a third bit length BL3 may be denoted by 8 bits, and a fourth bit length BL4 may be denoted by 7 bits.

The bit length determiner 210d may determine the bit length BL that is matched to (or most similar to) a frame difference of the image data IDATA by referring to the fourth lookup table 600. Further, the bit length determiner 210d may provide the determined bit length BL to the upper bit extractor 220.

Figure 7:
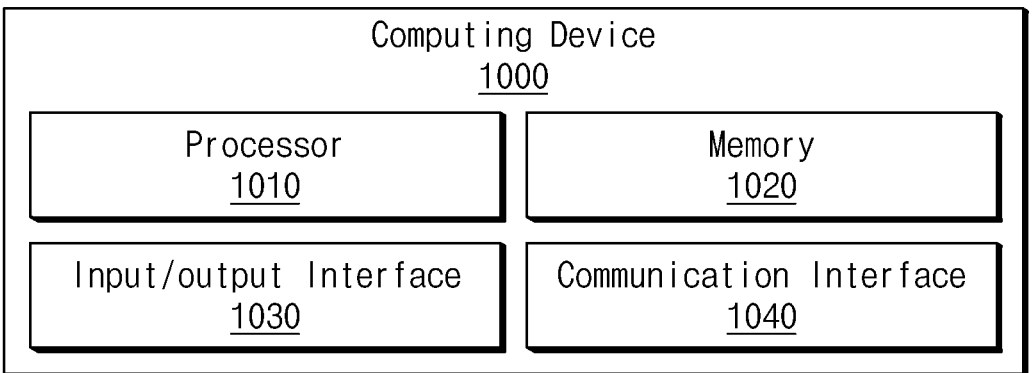
FIG. 7 is a block diagram illustrating a computing device corresponding to the image processing device of FIG. 1 based on some embodiments of the present disclosure.

FIG. 7 is a block diagram showing a computing device 1000 corresponding to the image processing device 100 of FIG. 1.

Referring to FIG. 7, the computing device 1000 may represent an embodiment of a hardware configuration for performing the operation of the image processing device 100 of FIG. 1.

The computing device 1000 may be mounted on a chip that is independent from the chip on which the image sensing device is mounted. According to one embodiment, the chip on which the image sensing device is mounted and the chip on which the computing device 1000 is mounted may be implemented in one package, for example, a multi-chip package (MCP), but the scope of the disclosed technology is not limited thereto.

The computing device 1000 may include a processor 1010, a memory 1020, an input and output (input/output) interface 1030, and a communication interface 1040.

The processor 1010 may process data and/or instructions required to perform the operations of the components (200~240) of the image processing device 100 described in FIG. 1. That is, the processor 1010 may refer to the image processing device 100, but the scope of the disclosed technology is not limited thereto.

The memory 1020 may store data and/or instructions required to perform operations of the components 200~240 of the image processing device 100, and may be accessed by the processor 1010. For example, the memory 1020 may be volatile memory (e.g., Dynamic Random Access Memory (DRAM), Static Random Access Memory (SRAM), etc.) or non-volatile memory (e.g., Programmable Read Only Memory (PROM), Erasable PROM (EPROM), Electrically Erasable PROM (EEPROM), flash memory, etc.).

That is, the computer program for performing the operations of the image processing device 100 disclosed in the present disclosure is recorded in the memory 1020 and executed and processed by the processor 1010, thereby implementing the operations of the image processing device 100.

The input/output interface 1030 is an interface that connects an external input device (e.g., keyboard, mouse, touch panel, etc.) and/or an external output device (e.g., display) to the processor 1010 to allow data to be transmitted and received.

The communication interface 1040 is a component that can transmit and receive various data with an external device (e.g., an application processor, external memory, etc.), and may be a device that supports wired or wireless communication.

As is apparent from the above description, the image processing device based on some embodiments of the present disclosure may reduce the size of image data of reference pixels to be used in noise reduction processing, may store the resultant image data, and may maximize noise reduction performance by maximally increasing the number of reference pixels to be stored.

The embodiments of the present disclosure may provide a variety of effects capable of being directly or indirectly recognized.

Although a number of illustrative embodiments have been described, it should be understood that modifications and enhancements to the disclosed embodiments and other embodiments can be devised based on what is described and/or illustrated in the present disclosure. Furthermore, the embodiments may be combined to form additional embodiments.

What is claimed is:

1. An image processing device comprising:
a bit length determiner configured to determine a bit length which indicates a number of at least one bit from among all bits of image data;
an upper bit extractor configured to extract, from the image data, at least one upper bit corresponding to the bit length; and
a noise processing unit configured to perform noise reduction processing for a target pixel using the at least one upper bit of the image data.

2. The image processing device according to claim 1, wherein the bit length determiner is configured to:
determine the bit length based on a gain of an image sensing device which generated the image data.

3. The image processing device according to claim 2, wherein
the gain includes a conversion gain of a pixel circuit corresponding to the target pixel, an analog gain of an analog-to-digital converter (ADC) corresponding to the target pixel, or a product of the conversion gain and the analog gain, and wherein the pixel circuit and the ADC are included in the image sensing device.

4. The image processing device according to claim 2, wherein the bit length determiner is configured to:

determine a bit length corresponding to the gain of the image sensing device by referring to a first lookup table in which multiple gains and multiple bit lengths are matched with each other.

5. The image processing device according to claim 4, wherein
in the first lookup table, as the gain increases, the bit length corresponding to the gain decreases.

6. The image processing device according to claim 1, wherein the bit length determiner is configured to
determine the bit length based on an exposure time of an image sensing device which generated the image data.

7. The image processing device according to claim 6, wherein
the exposure time is a time taken for a pixel circuit of the image sensing device corresponding to the target pixel to detect incident light.

8. The image processing device according to claim 6, wherein the bit length determiner is configured to
determine the bit length corresponding to the exposure time by referring to a second lookup table in which multiple exposure times and bit lengths are matched with each other.

9. The image processing device according to claim 8, wherein
in the second lookup table, as the exposure time increases, the bit length corresponding to the exposure time decreases.

10. The image processing device according to claim 1, wherein the bit length determiner is configured to
calculate a noise value of the image data; and
determine the bit length corresponding to the noise value.

11. The image processing device according to claim 10, wherein
the noise value includes a standard deviation of image data generated by optical black pixels corresponding to the target pixel.

12. The image processing device according to claim 10, wherein the bit length determiner is configured to
determine the bit length corresponding to the noise value by referring to a third lookup table in which multiple noise values and multiple bit lengths are matched with each other.

13. The image processing device according to claim 12, wherein
in the third lookup table, as the noise value increases, the bit length corresponding to the noise value decreases.

14. The image processing device according to claim 1, wherein the bit length determiner is configured to:
calculate a frame difference between image data of a current frame and image data of a previous frame; and
determine the bit length corresponding to the frame difference.

15. The image processing device according to claim 14, wherein the frame difference is obtained by
calculating, for each of pixels included in a target kernel including the target pixel, an absolute value of a value obtained by subtracting the image data of the current frame from the image data of the previous frame; and
performing summation of the absolute values respectively calculated for the pixels included in the target kernel.

16. The image processing device according to claim 14, wherein the bit length determiner is configured to
determine the bit length corresponding to the frame difference by referring to a fourth lookup table in which multiple frame differences and bit lengths are matched with each other.

13

14

17. The image processing device according to claim 16, wherein in the fourth lookup table, as the frame difference decreases, the bit length corresponding to the frame difference decreases.

18. The image processing device according to claim 1, further comprising:

a reference data storage unit configured to store reference data including the at least one upper bit and provide the reference data to the noise processing unit.

19. The image processing device according to claim 1, wherein the noise processing unit is configured to perform the noise reduction processing for the target pixel using at least one filter or a denoising convolutional neural network.

20. An image processing device comprising:

a bit length determiner configured to determine a bit length, which indicates a number of at least one bit from among all bits of image data, based on characteristic information of an image sensing device which generated the image data or characteristic information of the image data; and a noise processing unit configured to perform noise reduction processing for a target pixel using at least one upper bit corresponding to the bit length, the at least one upper bit being extracted from the image data.

\* \* \* \* \*